UNITED STATES PATENT OFFICE.

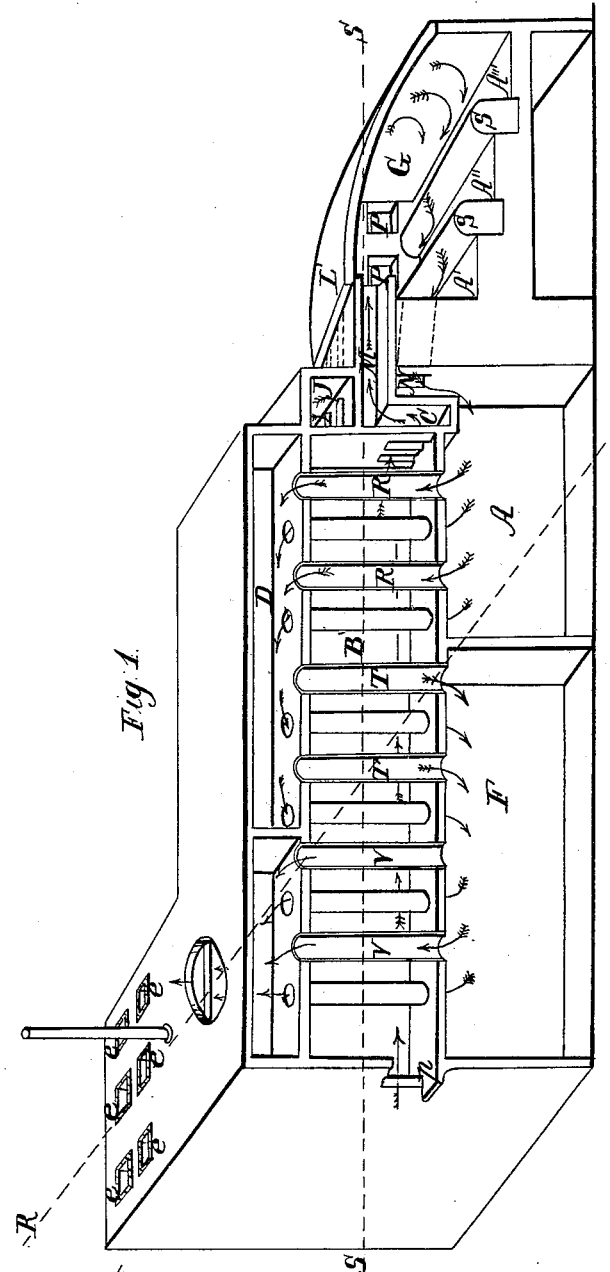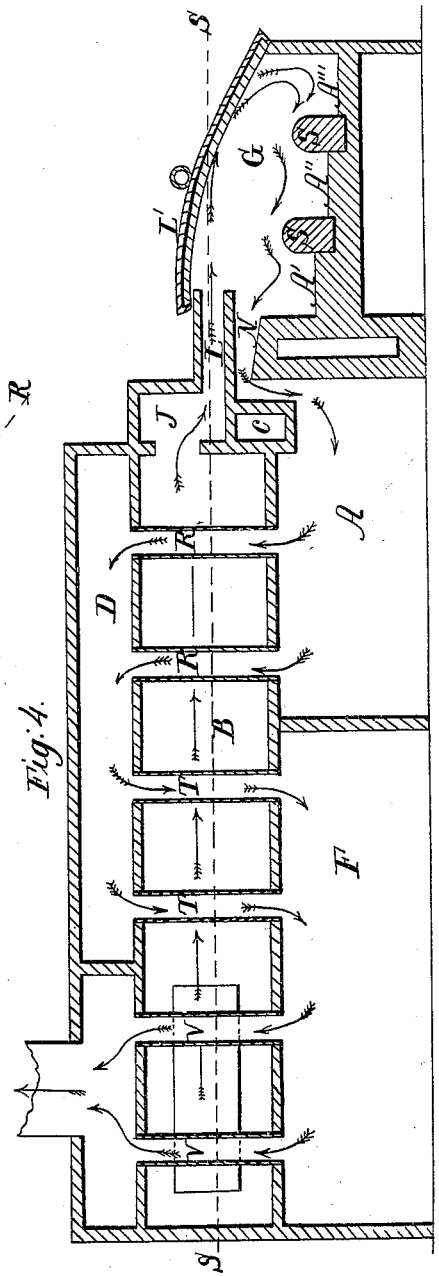

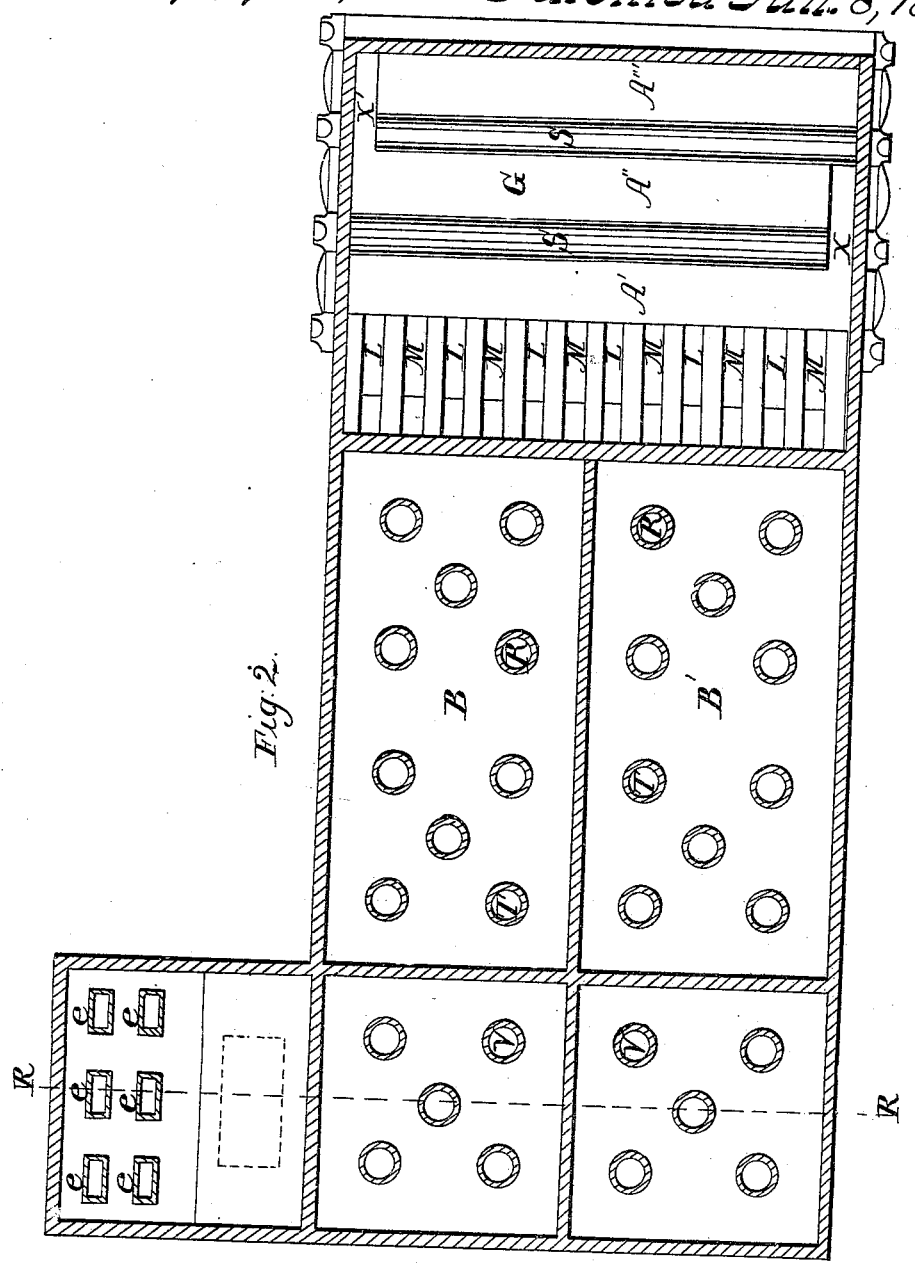

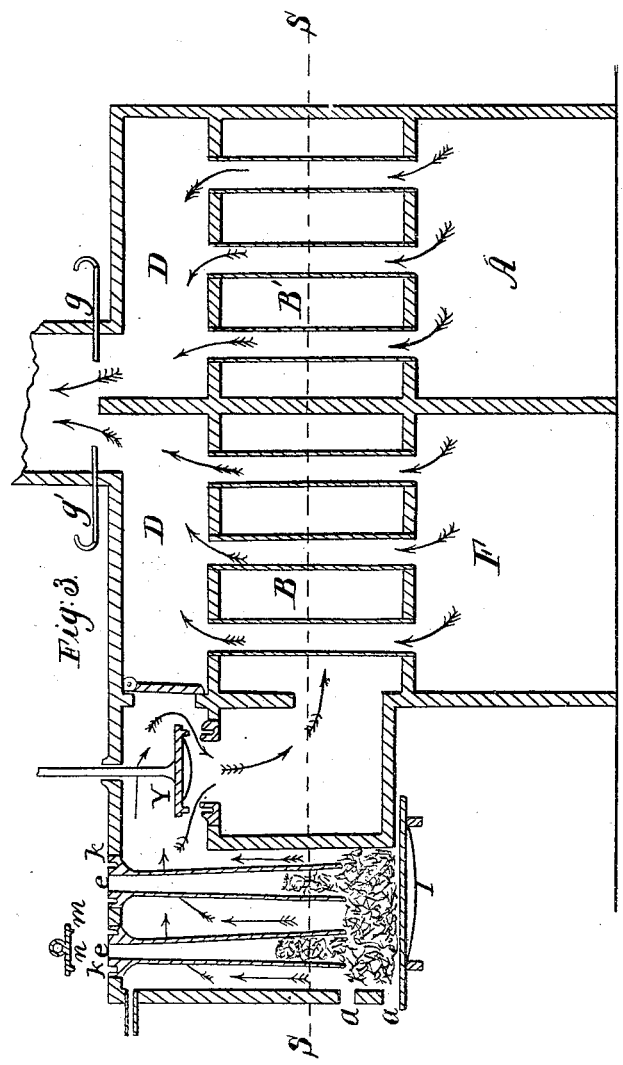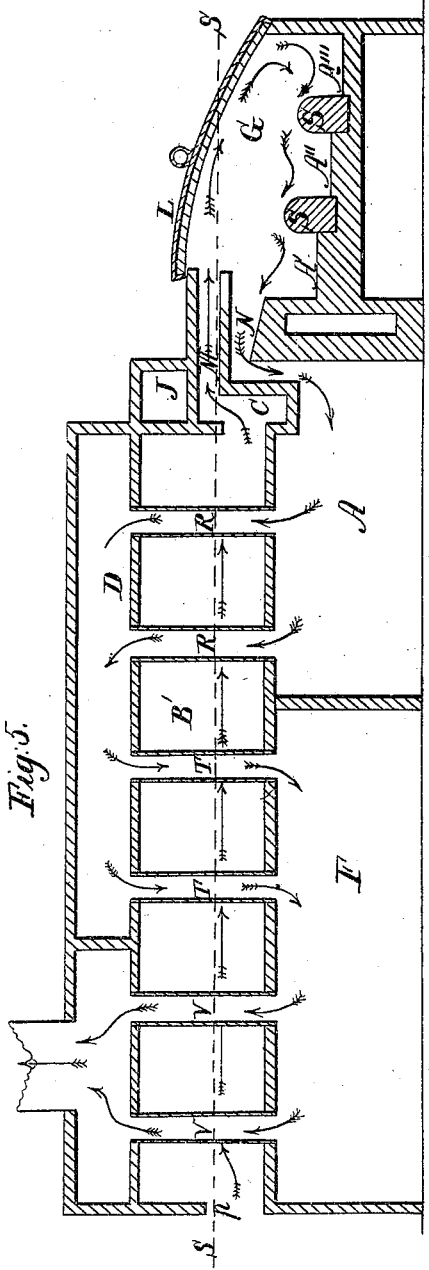

THOMAS J. CHUBB, OF WILLIAMSBURG, NEW YORK.

IMPROVEMENT IN FURNACES FOR THE MANUFACTURE OF IRON AND STEEL.

Specification forming part of Letters Patent No. 90,924, dated June 8, 1869.

*To all whom it may concern:*

Be it known that I, THOMAS J. CHUBB, of Williamsburg, in the county of Kings and State of New York, have invented a new and useful improvement in furnaces, wherein highly inflammable gases are generated in one compartment by the slow combustion of carbonaceous fuel, which is transmitted through a chamber heated to whiteness by the escaping products of combustion as it takes place in another compartment, so that the gas generated in the first instance is intensely heated preparatory to its delivery into the combustion-chamber, where it is brought in contact with currents of atmospheric air previously heated to the same degree and in a similar manner as the incoming gases; and I hereby declare that the following is a full, clear, and exact description of my invention, reference being had to the accompanying drawings, forming part of this specification, and to the letters of reference marked thereon.

The nature of my invention consists in constructing furnaces to be used for melting, refining, and vaporizing metals, minerals, earthy, solid or other substances, and for various purposes, with a series of flues to admit separate, continuous, and simultaneous currents of gases and atmospheric air to pass onward unmingled to a place of ignition and combustion, which separate, continuous, and simultaneous currents of unmingled gases and air are heated at one and the same time, while passing through their respective flues, by the products of their joint combustion escaping through another series of flues, divided from those of the incoming gases and air by thin walls or partitions, through the medium of which the waste heat arising from said combustion is transmitted or imparted to said currents of gases and air. Also, in constructing furnaces of this character with heating and intensifying chambers in which are placed a series of tubes in sets or clusters, and so arranged with relation to each other and the flues and chambers as that the waste heat arising from the joint combustion of gases and air will pass through them alternately, and in regular succession, but in reverse directions, on its way to the chimney, by which the heat escaping with the outgoing waste gases, owing to their lengthened passage through the tubes, are given a greater opportunity to impart that heat, through the medium of the tubes, to the incoming gases and air on their passage between and around them to the point or place of ignition and combustion.

Also, in conducting the heated gases and air from the heating and intensifying chamber through a series of separate alternating flues arranged to admit the gases and air to enter at one and the same side of the furnace, whereby the current of flame is caused to strike the arch or top previous to its action on the metal below and subsequent escape through the exit-flues to the chimney. Also, in setting the arch or top of the refining chamber or furnace at such an angle with respect to the supply and exit flues as that the current of flame will be deflected downward and fresh atoms of heated matter constantly brought in rapid succession to impinge upon the metal. Also, in dividing the melting and refining chamber into two or more parts, by building up from the bed of the furnace one or more low partitions or dwarf walls, so as to form a series of small melting and refining chambers within the one chamber, and yet so arranged as to be operated each from a door or doors leading thereinto, and constructed with such relation to each other as that the metal in one division, on becoming sufficiently heated or molten, may flow or can be otherwise transferred directly into one of the other chambers or divisions, as the process of melting and refining may require. Also, in forming the melting and refining chambers of different depths, each with its bottom set at a slight angle in reverse direction to the other, so that the lowest part of the upper chamber will be on a line, or nearly so, with the highest part of the one next it, and providing each chamber with a gate or outlet at the lowest part of its bottom, communicating with the contiguous chamber, to facilitate the transfer of metals from one to the other, by which construction and arrangement of small chambers within the body of the combustion-chamber the process of melting and refining or repeatedly refining metals of different qualities may be carried on continuously at one and the same time in the same furnace and under the same or a continuous heat. Also, in the use of deep vertical chutes or open pipes extending through the top of the generating-chamber and down to within a short distance of the grate-bars, by which an even layer of fuel can be had at all times of a certain and sufficient depth to insure a regular supply of gas, by simply shoveling it into the upper or open end or mouth of each tube, the fuel used for this purpose being preferably fine coal-dust. And if each pipe or feeder be kept filled, no gas will escape at their upper end, but the entire result of gasification will find exit by a properly-arranged valve direct into the superheating and intensifying chamber.

To enable others to understand, make, and use my improved furnace, I will proceed to describe its construction and operation by reference to the accompanying drawings, wherein Figure 1, Sheet 1, represents a perspective view of my furnace, having one of the side walls removed, exhibiting by this means a part of its interior, and in which may be seen a gas and air heating apparatus and a steel converting and melting furnace. Fig. 2, Sheet 2, is a section through the entire apparatus taken in a horizontal plane, indicated by the dotted lines $s\ s$ in Figs. 1, 3, 4, and 5. Fig. 3, Sheet 2, is a transverse section taken through Figs. 1 and 2 in the vertical plane indicated by the dotted line R R, showing the furnace in which the gas is produced, the means of introducing the fuel and the direction taken by the gas generated on its passage to the combustion-chamber. Fig. 4, Sheet 3, is a longitudinal vertical section through the gas-heating portion of the apparatus and combustion-chamber. Fig. 5, Sheet 3, is a longitudinal vertical section through the air-heating portion of the apparatus and its flues leading into the combustion, melting, and refining chamber.

All the drawings are lettered, and similar letters denote corresponding parts in the several views.

I construct my apparatus with a gas-generator, X, of the shape of an ordinary furnace, with grate-bars at the bottom, upon which the fuel is intended to rest, and between which air is supplied to support combustion. From the top of this generator X, and extending down to within a short distance of the grate-bars I, are arranged a number of vertical pipes, $e\ e$, open at both ends. Through these pipes the fuel is introduced from the top, which, in falling down, is spread over the grate I beneath to the depth of several inches, or until the layer of fuel extends up to the lower ends of the pipes, which pipes are then filled to the top. As the fuel burns away or becomes impoverished, it is raked out from beneath the bars forming the grate, and the extra fuel in the feed-pipes distributed over the fire by introducing a poker through the openings or orifices $a$ in the front of the furnace immediately beneath these lower ends, and by which the fuel may be spread as occasion may require. The upper ends of these feed-tubes or pipes are provided each with a closely-fitting lid, $n$, having a flange, $m$, extending down from its face, which is intended to fit into a corresponding-shaped recess, $k$, around the mouth of each pipe, and these, when partially filled with sand for the flanges of the lids to rest upon, form a sufficiently tight packing to prevent the escape of gas.

The gases produced by burning the carbonaceous fuel in the generator pass through a valve, Y, directly into the heating and intensifying chamber B, as indicated by the flight of arrows. This heating and intensifying chamber B is of the shape of a long equiangular box, having flues above and beneath, communication being had between the upper flues D and lower flues A and F by a system of pipes, V T R, passing through the chambers. These pipes V T R are arranged in clusters or sets, around which play the gases generated in the gas-producing furnace, gradually increasing in heat and volume on their travel toward a transverse box or receiver, J, from which they are delivered by a series of flues, L, leading directly into the combustion-chamber G, which chamber is constructed as represented in the drawings, Fig. 1, Sheet 1; Fig. 2, Sheet 2; Figs. 4 and 5, Sheet 3. By reference thereto it will be seen that it is nearly square, and provided with a slightly-curved top, L', extending from above the gas and air supplying flues M L, and inclining downward and resting on the opposite side of the furnace, by which arrangement the gas and air as they leave their respective flues, on their passage from the heating-chambers B B', will be deflected toward the bottom of the furnace. This curved top is constructed of brick secured in an iron clamp, L', which enables it to be removed for repairs or changed, as circumstances may require. By reference to the drawings in which this combustion, melting, and refining chamber is shown, it will be seen that its bed is divided into three compartments, A' A'' A''', by building up within the furnace two dwarf walls, $s\ s$, extending from opposite sides of the furnace nearly its entire length, where they terminate, forming a small passage, $x'\ x$, for the flow of metal from one division to the other, but which is intended to be stopped by the introduction of a brick or other means during some of the operations of melting and refining. As hereinbefore stated, these melting-chambers A' A'' A'' are of different depths, the one A' next the heating and intensifying chamber being somewhat elevated above the others, each having its bottom slightly inclining downward toward the opening left at one end of dwarf wall next it, by which all the metal melted in one of the upper chambers will, unless prevented, flow into the next or the one immediately below it.

At each end of these shallow melting and refining chambers is a small door, P P, as seen in the drawing, Fig. 1, Sheet 1, by which the interior of the furnace is reached, and through which the manipulation of metals is carried on. As the heated gases and air enter this chamber and spring into flame, on being fired, they will curve down, and, after passing over the dwarf walls, s s, forming the small chambers, will find exit through a number of flues, N, just below and on the same side of the furnace as the supply-pipes L M, whence they take a downward direction into a large flue, A, beneath the heating-chamber B, and thence upward through the first cluster of tubes R into the flue D above the heating-chamber B, thence downward through the next cluster of tubes T into another lower flue, F, and then take an upward turn through another set or cluster of tubes, V, and escape through the chimney.

On the side of this heating-chamber B, and furthest from the gas-generator X, Fig. 3, is placed another substantially similar chamber, B', with the same arrangement of tubes, spaces, passages, and communications, and is like it in every particular except that at the end farthest from the combustion-chamber G, instead of an opening for the admission of gas, it is provided with a small door, p, for admission of atmospheric air, which, on entering, passes by conduction through this chamber between and around the exterior of the hot tubes V T R in the same manner as the ingoing gases are conducted through the first-mentioned chamber, and which, on becoming heated and expanded, is received into a transverse receptacle, C, and eventually introduced through the narrow flues M, alternating with those used for supplying the heated gases to the combustion-chamber, where the heated air mingles with the heated gas, forming a highly inflammable matter, which, on being ignited, produces intense heat. In this apparatus are placed two sliding dampers, g' g, shown in Fig. 3, Sheet 2, which are represented as being situated in the lower part of the chimney, but which may be arranged at any intermediate point between the combustion-chamber and the top of the chimney. These dampers g' g are for the purpose of controlling and regulating the exit of the waste gases and heat. For instance, if the valve g' be closed, then all the waste gases and heat would be compelled to pass out through the tubes of the air-heating chamber, but by opening this valve and closing the other, g, the waste heat, &c., would pass through the tubes of gas-heating chamber, or they may be set so that constant but different degrees of heat may be imparted to either chamber, as the process of melting and refining may require.

Having stated the nature of my invention, what I claim is—

1. Constructing furnaces with a series of flues to admit separate, continuous, and simultaneous currents of gases and air to pass onward unmingled to a place of combustion in which said separate, continuous, and simultaneous currents of mingled gases and air are heated at one and the same time by the product of their joint combustion escaping through another series of flues divided from the incoming gases and air by thin walls or partitions, through the medium of which the heat of the outgoing gases is transmitted or imparted to the incoming gases and air on their way to the combustion-chamber, when applied to this peculiar mechanical construction and arrangement of furnace.

2. Placing the flues or tubes in the heating and intensifying chamber in sets or clusters, each set so arranged with relation to the other as that the products of combustion will pass through them alternately and in reverse direction.

3. Conducting the heated gases and air from the heating and intensifying chambers through a series of separate, alternating flues, L M, arranged so as to admit the gases and air to enter at one and the same side of the furnace, by which the flame will be deflected upon the metal during the operation of melting and refining.

4. Setting the arch of the melting and refining chamber at such an angle with respect to the supply and exit flues as that the current of flame will be directed downward and caused to impinge against the metal during the operation of melting and refining.

5. Dividing the melting-chamber into two or more parts by building up from the bed of the furnace one or more low partitions, so as to form a number of small melting-chambers within the body of one furnace.

6. Arranging a number of small melting-chambers within the body of one furnace, as that the metal melted in one of these chambers will flow or can be otherwise transferred directly to one of the other chambers, as the process of melting and refining may require.

7. Constructing the melting and refining chamber of different depths, and the bottom of each at a slight incline, so that the lowest part of the bottom of the upper chamber will be on a level, or nearly so, with the highest part of the bottom of the one next it, and providing each chamber with a gate or outlet at the lowest part of its bottom communicating with the contiguous chamber, to facilitate the transfer of metals from one to the other.

8. Placing at each end of the small melting and refining chambers a door leading from the outside of the furnace thereinto, by which the interior of each may be reached, and through which the manipulation of metals may be carried on.

9. Making the top of the combustion-chamber or the melting and refining chamber removable by securing the brick composing it within the grip of a strong iron clasp.

10. The valves or dampers g g', arranged for the purposes set forth.

11. The construction, combination, and arrangement of the several parts of this furnace, and its appendages, substantially in the manner herein shown and set forth.

THOS. J. CHUBB.

Witnesses:
JACOB REPPERT,
JOHN STEWART.